United States Patent
Libman et al.

(10) Patent No.: US 7,318,247 B2
(45) Date of Patent: Jan. 15, 2008

(54) BUCKET COMBINATION

(75) Inventors: Robert J. Libman, Champaign, IL (US); Enzo Berti, Dolo/Venice (IT)

(73) Assignee: The Libman Company, Arcola, IL (US)

( * ) Notice: Subject to any disclaimer, the term of this patent is extended or adjusted under 35 U.S.C. 154(b) by 373 days.

(21) Appl. No.: 10/400,222

(22) Filed: Mar. 27, 2003

(65) Prior Publication Data

US 2004/0187248 A1 Sep. 30, 2004

(51) Int. Cl.
  *A47L 13/58* (2006.01)
(52) U.S. Cl. ............................ 15/260; 15/263; 15/264; 220/23.87; 220/756; 220/760; 220/769; 220/770; D32/53; D32/54
(58) Field of Classification Search .................. 15/260, 15/263, 264, 261, 262; D32/53, 54; 220/769, 220/760, 23.87, 23.89, 756, 752, 770, 761, 220/762
See application file for complete search history.

(56) References Cited

U.S. PATENT DOCUMENTS

| | | | |
|---|---|---|---|
| 38,902 A * | 6/1863 | Lawson | 126/243 |
| 1,333,917 A * | 3/1920 | Hollands | 220/762 |
| 1,627,383 A * | 5/1927 | Gotheberg | 15/263 |
| 1,646,537 A * | 10/1927 | Hurley | 220/761 |
| 1,918,986 A * | 7/1933 | Schulman | 15/263 |
| 2,365,099 A * | 12/1944 | O'Brien | 220/762 |
| 2,443,954 A * | 6/1948 | Givens | 15/260 |
| 3,383,732 A * | 5/1968 | James et al. | 15/260 |
| D216,277 S | 12/1969 | James | |
| D218,778 S | 9/1970 | Gunfaus | |
| D222,892 S | 1/1972 | Gunfaus | |
| D227,148 S | 6/1973 | Oas | |
| 4,161,799 A | 7/1979 | Sorrells | |
| 4,583,666 A * | 4/1986 | Buck | 222/109 |
| 4,735,332 A | 4/1988 | Thumser | |
| 5,063,631 A | 11/1991 | Parker | |
| 5,414,892 A * | 5/1995 | Clark, Jr. | 15/263 |
| D368,347 S * | 3/1996 | Kruger | D32/53 |
| 5,548,865 A * | 8/1996 | Pagani | 15/262 |
| D407,878 S * | 4/1999 | Carlson | D32/53 |
| 5,938,035 A * | 8/1999 | Oglesby et al. | 206/576 |
| D417,935 S | 12/1999 | Primeau | |
| 6,006,397 A * | 12/1999 | Williams et al. | 15/261 |
| 6,065,175 A | 5/2000 | Tejerina | |
| D462,491 S | 9/2002 | Hauenstein | |
| 2002/0066152 A1* | 6/2002 | Dingert | 15/260 |
| 2002/0116781 A1* | 8/2002 | Williams et al. | 15/261 |

FOREIGN PATENT DOCUMENTS

GB 2189384 * 10/1987

* cited by examiner

*Primary Examiner*—Gary K. Graham
(74) *Attorney, Agent, or Firm*—Banner & Witcoff, Ltd.

(57) ABSTRACT

A bucket combination has a bucket and a removable inner bucket and wringer that fit within it. The inner bucket fits on one side of the larger bucket, and has three loops with tabs that extend over an upper rim on the bucket and engage a lower edge section on the rim. The inner bucket also has a bail that fits within a recess to provide a flat upper surface. The wringer rests on top of the upper surface on the inner bucket, and has a wringing section that fits within it. Flanges on the wringer fit within the loops on inner bucket and directly engage the lower edge section on the rim on the larger bucket. The flanges have an outwardly-extending arm.

23 Claims, 9 Drawing Sheets

BUCKET COMBINATION

BACKGROUND OF THE INVENTION

The present invention relates generally to buckets, and more particularly to buckets for household use.

Buckets are often used with used with mops and wringers. In a conventional mop arrangement, the bucket is filled with clean water which becomes dirty as it is used.

BRIEF DESCRIPTION OF THE INVENTION

A convenient new combination of a bucket and a removable wringer has been developed. The arrangement can be used with a removable inner bucket that allows the user to keep dirty water separate from clean water.

The removable wringer has a wringer section that fits within an upper rim on the bucket. It also has a flange that fits over the upper rim and a tab that engages a lower edge section on the upper rim, holding the wringer in place.

The removable wringer is preferably sized so that, when attached to the bucket, the user can either place the mop in the wringer or dip a mop into the water in the bucket. This can be accomplished by providing that the mouth of the bucket spans a horizontal area that is at least about twice as large as the horizontal area spanned by the wringer section on the removable wringer. For example, the upper rim on the bucket and the wringer section may be configured so that the bucket has a pair of elongate sides between curved ends, and the wringer section covers only one end of the bucket.

To hold the wringer in place, the wringer may have spaced flanges that fit over the rim of the bucket. The wringer may also have a downwardly-projecting knob that is spaced inwardly from the flange at a distance that is approximately equal to the width of the upper rim on the bucket. The flange on the removable wringer may also have an outwardly extending arm, which can be used to facilitate release of the wringer from the bucket.

The optional removable inner bucket fits within the reservoir and is sized to receive the removable wringer. The removable inner bucket may be secured to the larger bucket with a projection that is similar to the kind of flange that can be used to attach the removable wringer. The projection may be in the form of a loop that has an interior aperture that is sized to receive the outer flange on the removable wringer. The loop may have two tabs that engage the lower edge section on the upper rim, each tab on an opposite side of the interior aperture.

The inner bucket may also have a recess and a bail that fits within the recess in order to provide a flat upper surface for the wringer.

BRIEF DESCRIPTION OF THE DRAWINGS

The invention may be better understood by referring to the accompanying drawings, in which.

DETAILED DESCRIPTION OF THE DRAWINGS

Figure 1:
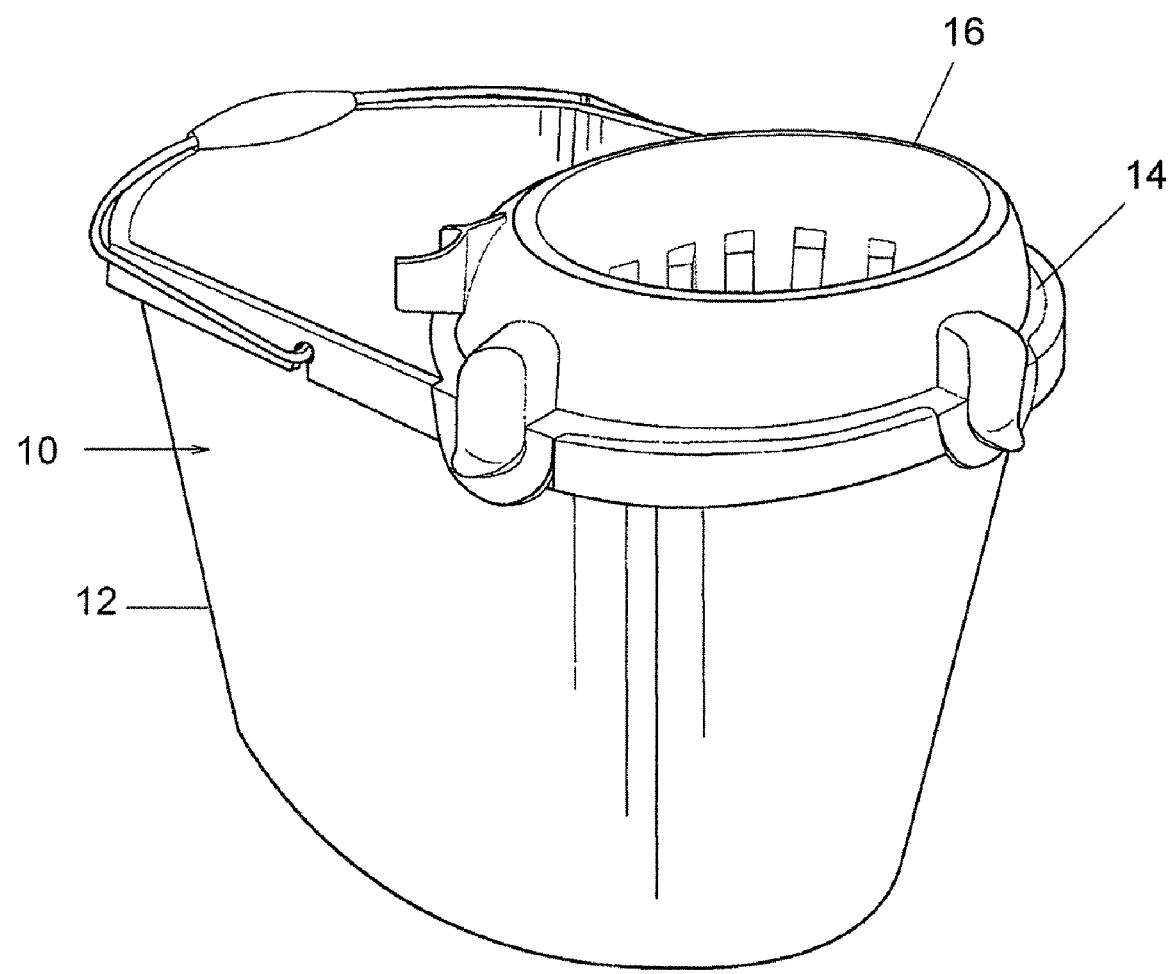
FIG. 1 is a perspective view of a bucket combination in accordance with one embodiment of the invention.
Figure 2:
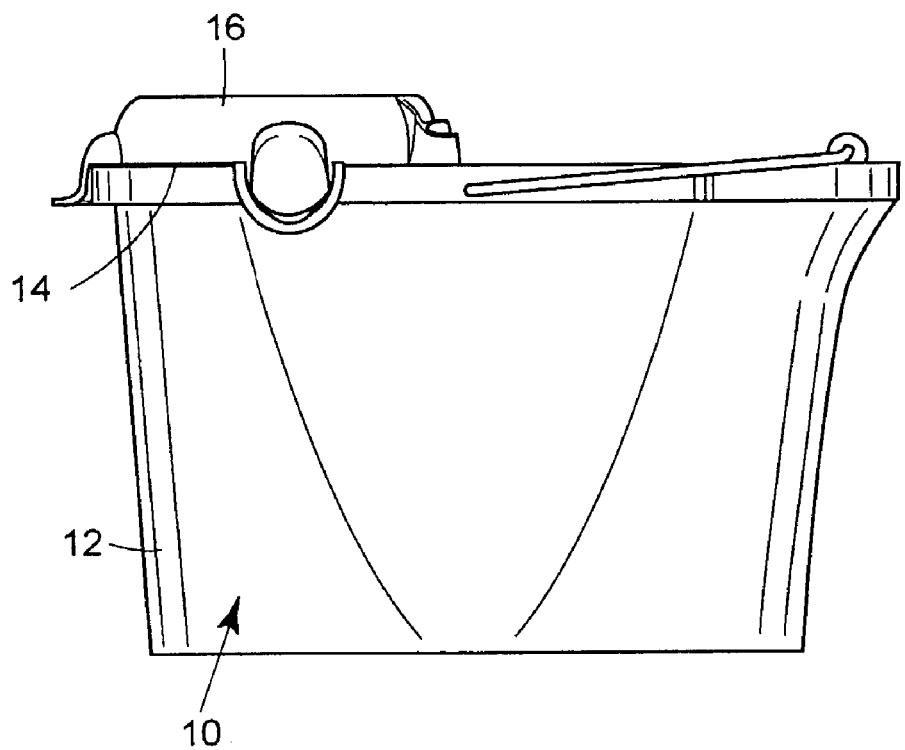
FIGS. 2 and 3 are reduced side and top views of the bucket combination seen in FIG. 1, showing the inner bucket rotated 180° within the larger bucket.
Figure 3:
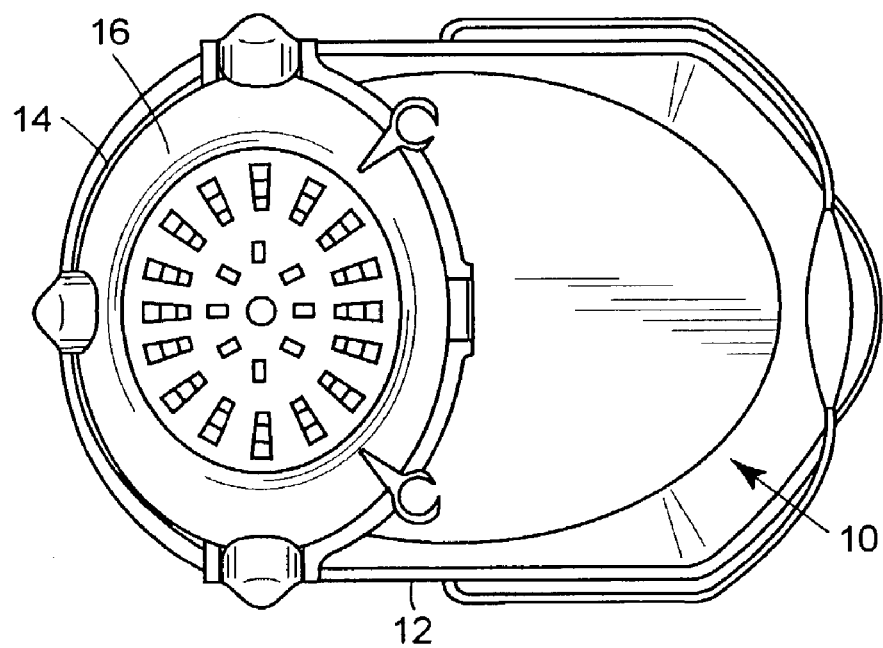

FIGS. 1-3 show one embodiment of a bucket combination 10 in accordance with the present invention. The illustrated combination includes a bucket 12, an inner bucket 14, and a removable wringer 16.

Figure 4:
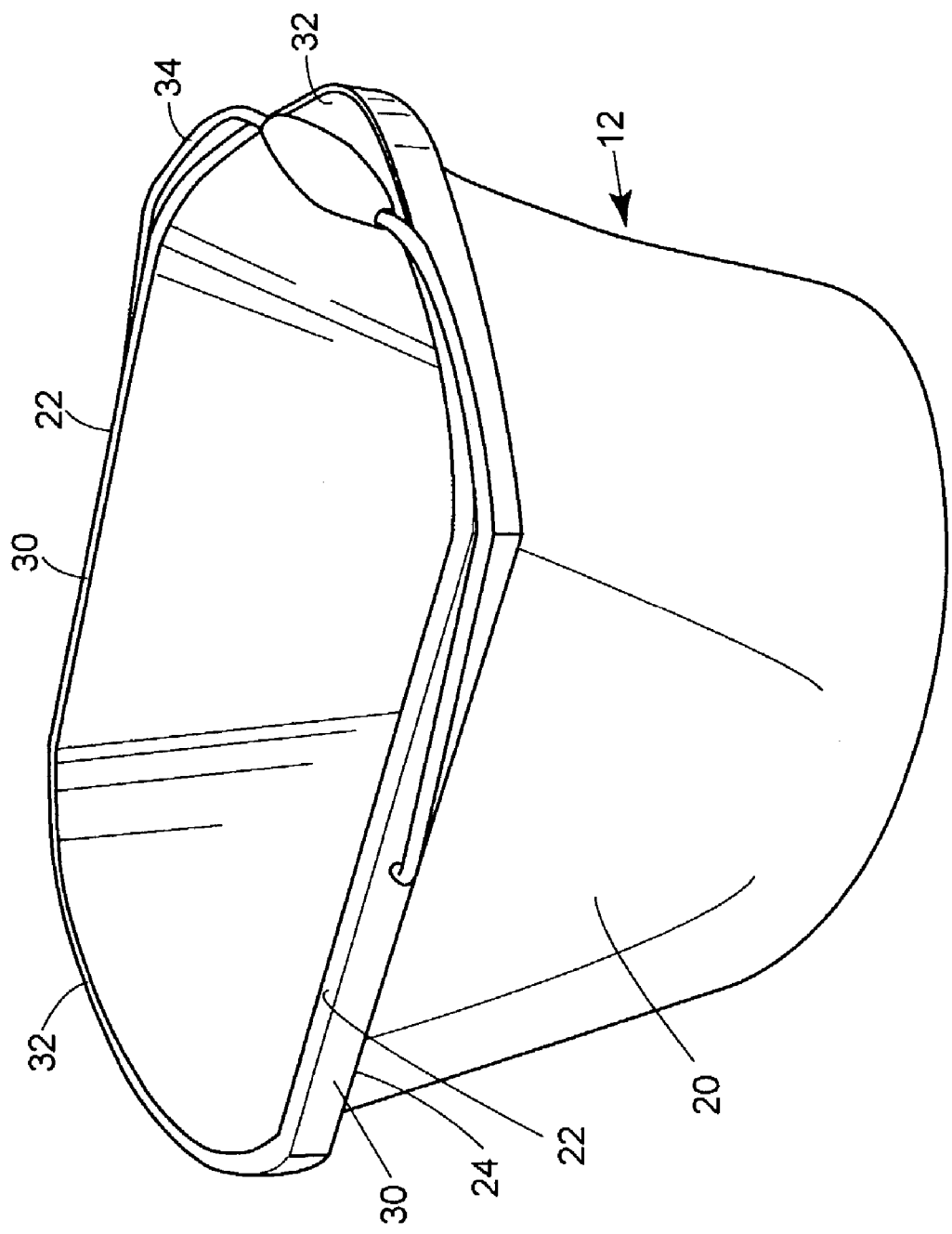
FIGS. 4-6 are perspective and reduced top and side views of the larger bucket in the combination seen in FIGS. 1-3.
Figure 5:
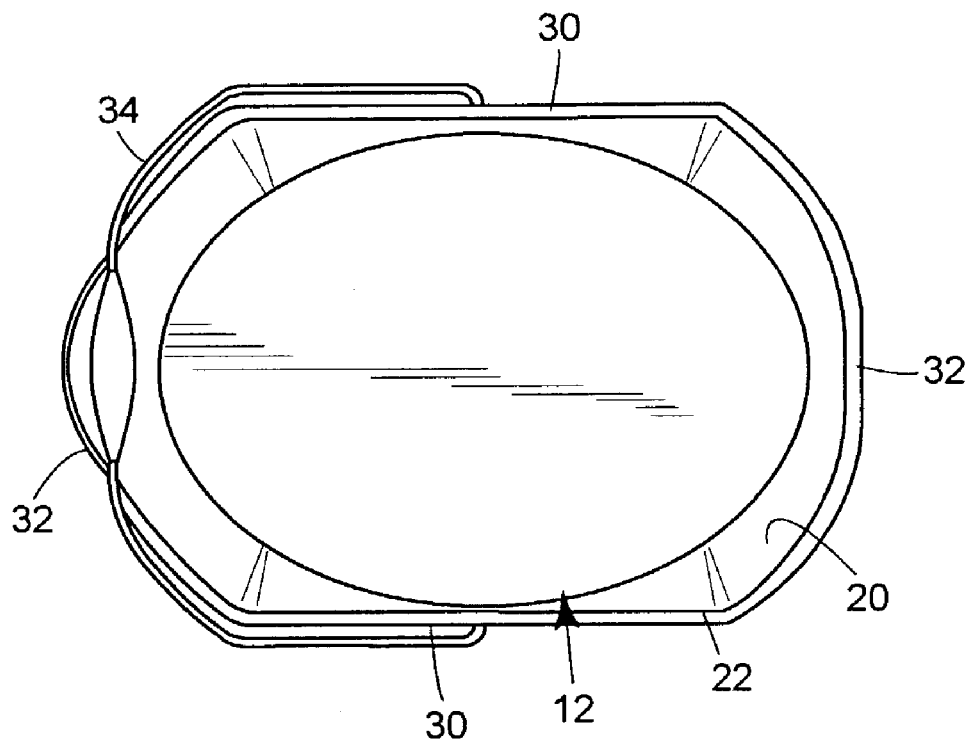
Figure 6:
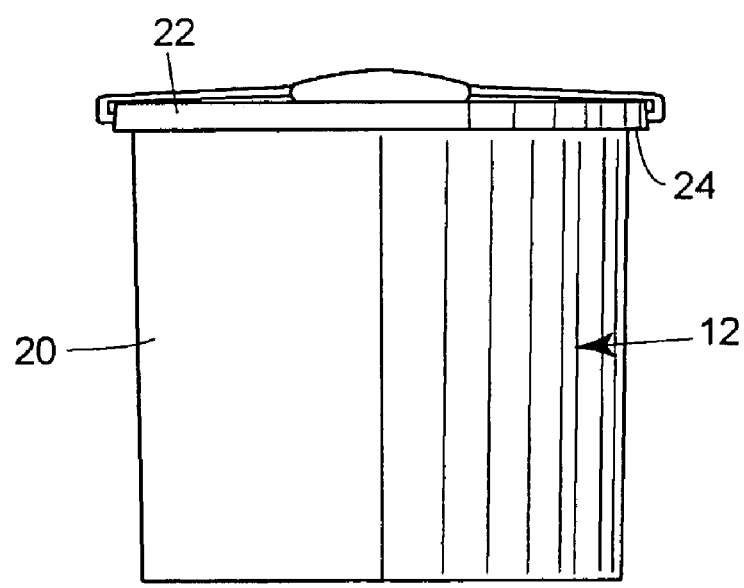

The bucket 12 is seen better in FIGS. 4-6. Like many conventional buckets, the bucket has a reservoir 20 and an upper rim 22. The upper rim has a lower edge 24. The bucket is preferably made of plastic or some other sturdy material.

The upper rim 22 of illustrated bucket 12 has a pair of elongate sides 30 between non-linear ends 32. These sides and ends define an opening that spans a horizontal area of about 160 square inches. The bucket has an optional handle 34, and could also be provided with wheels. Other shapes and arrangements could also be used.

Figure 7:
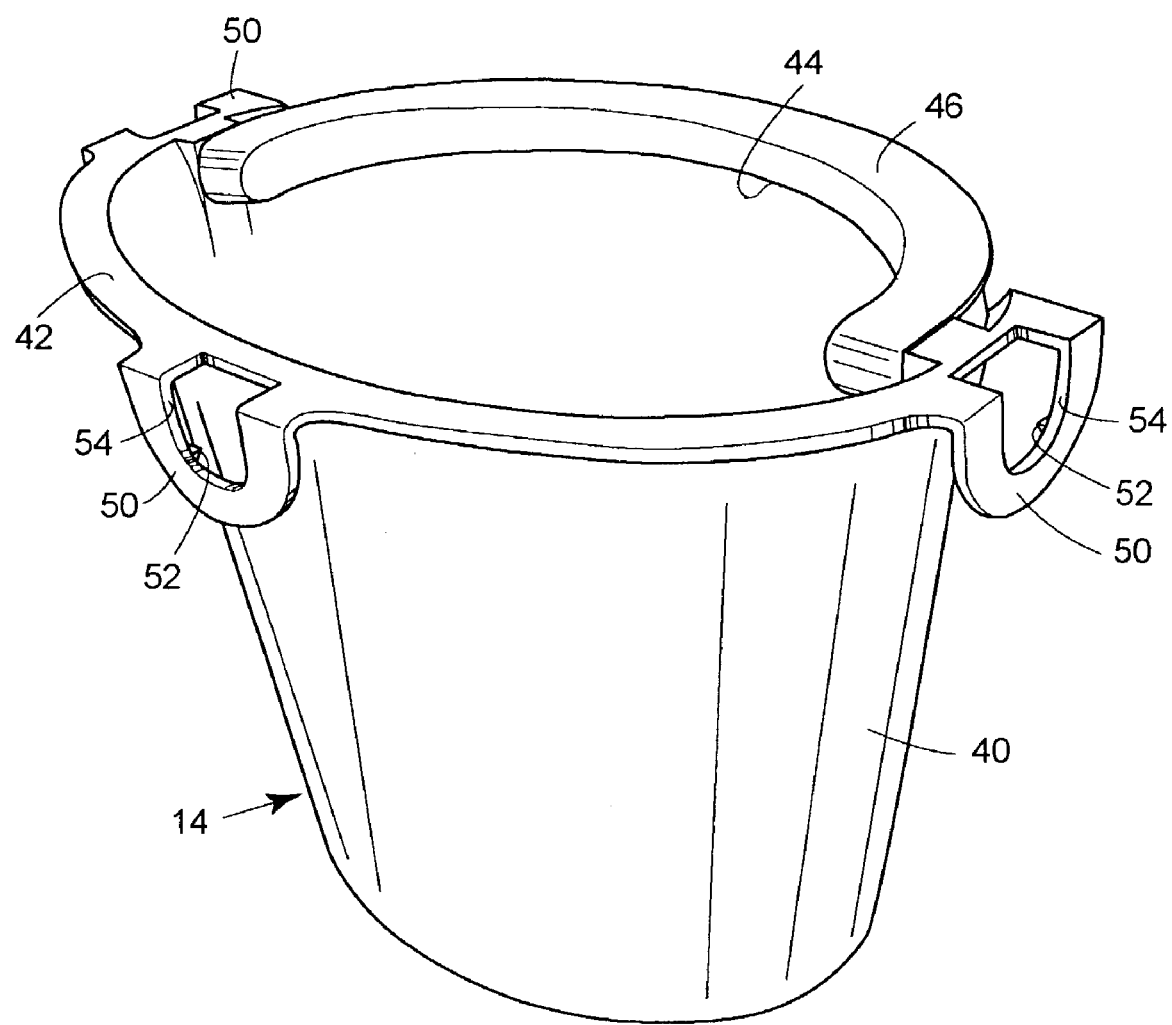
FIGS. 7-9 are perspective and reduced top and side views of the inner bucket in the combination seen in FIGS. 1-3.
Figure 8:
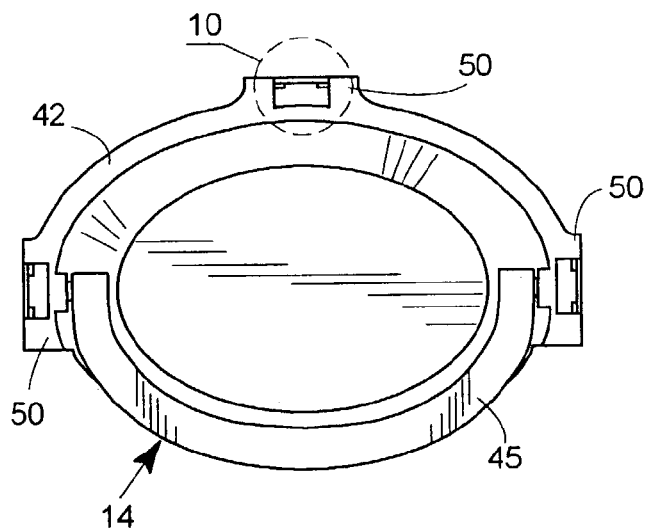
Figure 9:
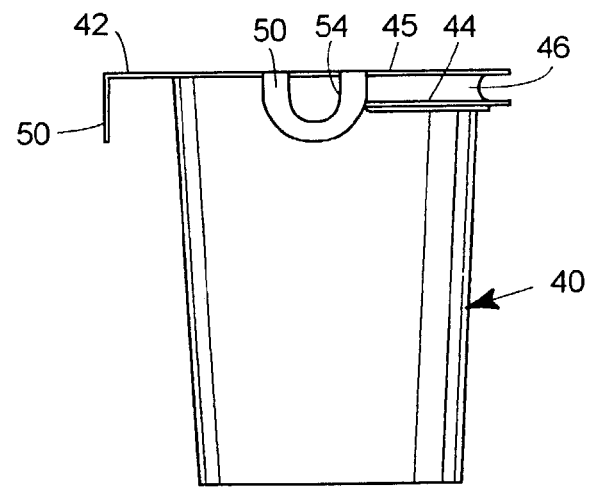

The optional removable inner bucket 14 is best seen in FIGS. 7-9. The inner bucket fits within the reservoir 20 on the larger bucket 12 and is sized to receive the removable wringer 16. When an inner bucket is used, dirty water that is wrung from a mop in the wringer collects in the inner bucket, rather than draining into clean water in the reservoir of the larger bucket.

The illustrated inner bucket 14 has a generally elliptical opening at the top of a receptacle 40. An upper ledge 42 extends around half the perimeter of the illustrated inner bucket. The other half of the perimeter is shown with a recess 44 that receives an optional bail 46. The illustrated bail has a flat side 45 that forms a flat surface on the inner bucket when the bail is received in the recess.

The inner bucket 14 is sized to be received within one end of the larger bucket 12, with the upper ledge 42 resting on portions of the upper rim 22 on the larger bucket. Projections 50 that extend from the upper ledge on the inner bucket fit over the upper rim on the larger bucket to prevent the inner bucket from sliding toward the opposite end of the larger bucket. While three projections are shown on the inner bucket, not all may be needed.

Figure 10:
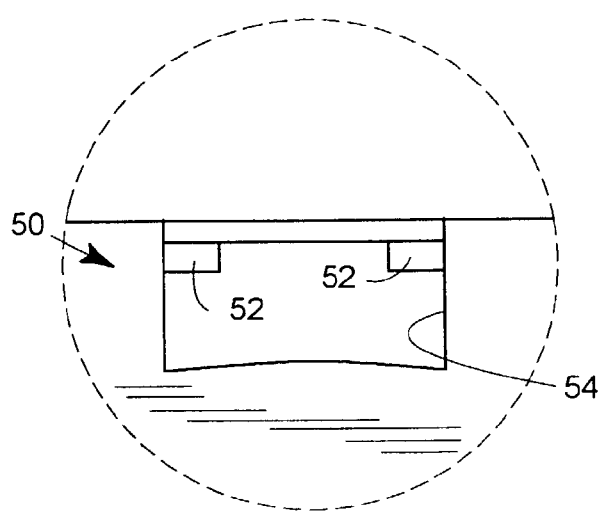
FIG. 10 is an enlarged fragmentary view of the portion of the inner bucket marked as 10 in FIG. 8.
Figure 11:
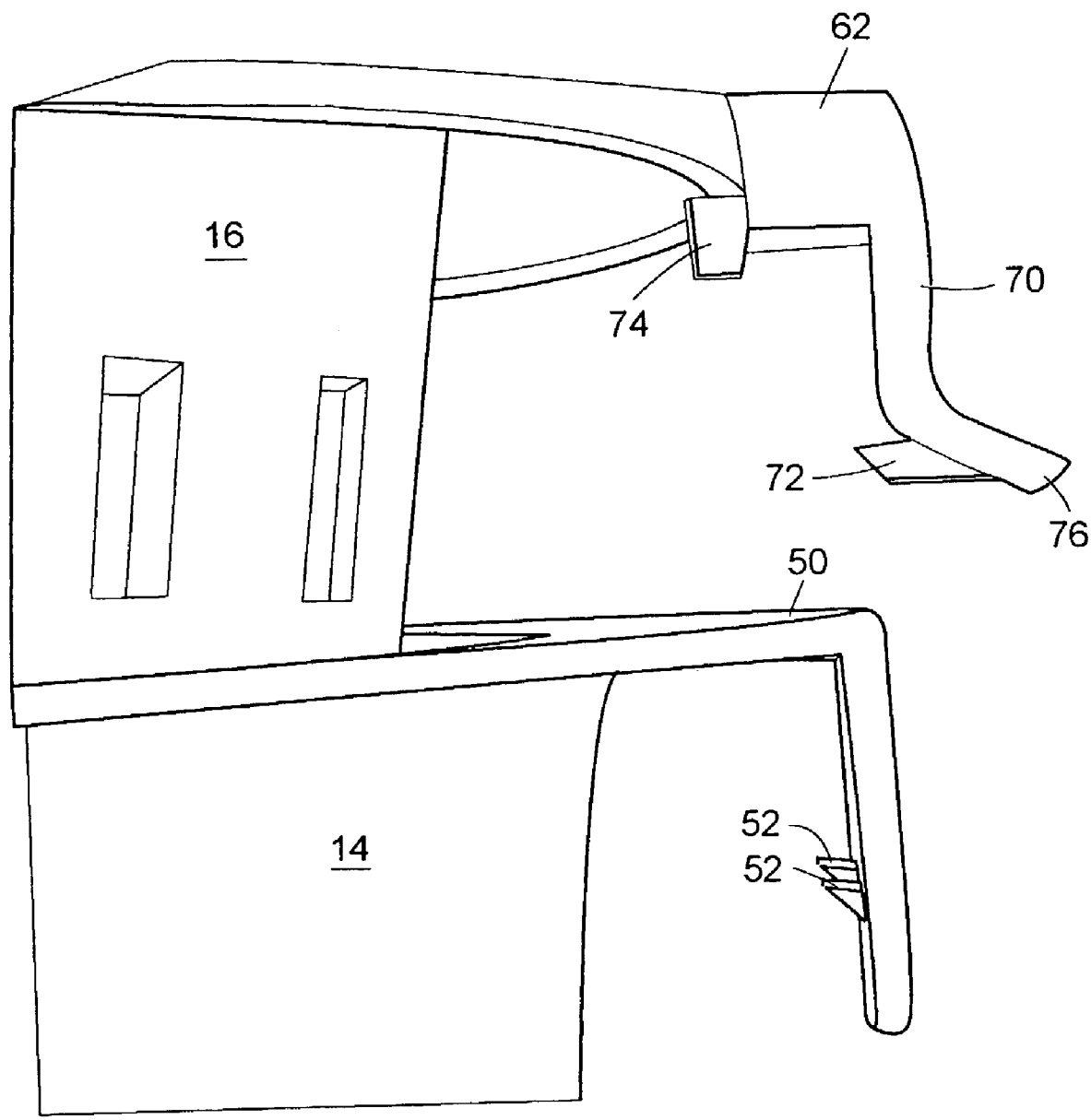
FIG. 11 is a fragmentary perspective view of the portion of the upper bucket seen in FIG. 10 with a corresponding part of the wringer being positioned.

Some of the details of the illustrated projections 50 on the inner bucket 14 can be best seen in FIGS. 10 and 11, where one of the projections is shown with two inwardly-extending tabs 52. When the inner bucket is disposed in the larger bucket, the tabs slide down over the upper rim 22 of the larger bucket and snap in place against a section of the lower edge 24 of the upper rim (FIG. 4), holding the inner bucket down. In the illustrated embodiment of the inner bucket, the projection 50 is in the form of a bent loop that has an interior aperture 54 that measures about an inch-and-a-half wide 9. The two tabs are on opposite sides of the interior aperture. Other arrangements could be used. Advantages of this arrangement will become apparent below.

Figure 12:
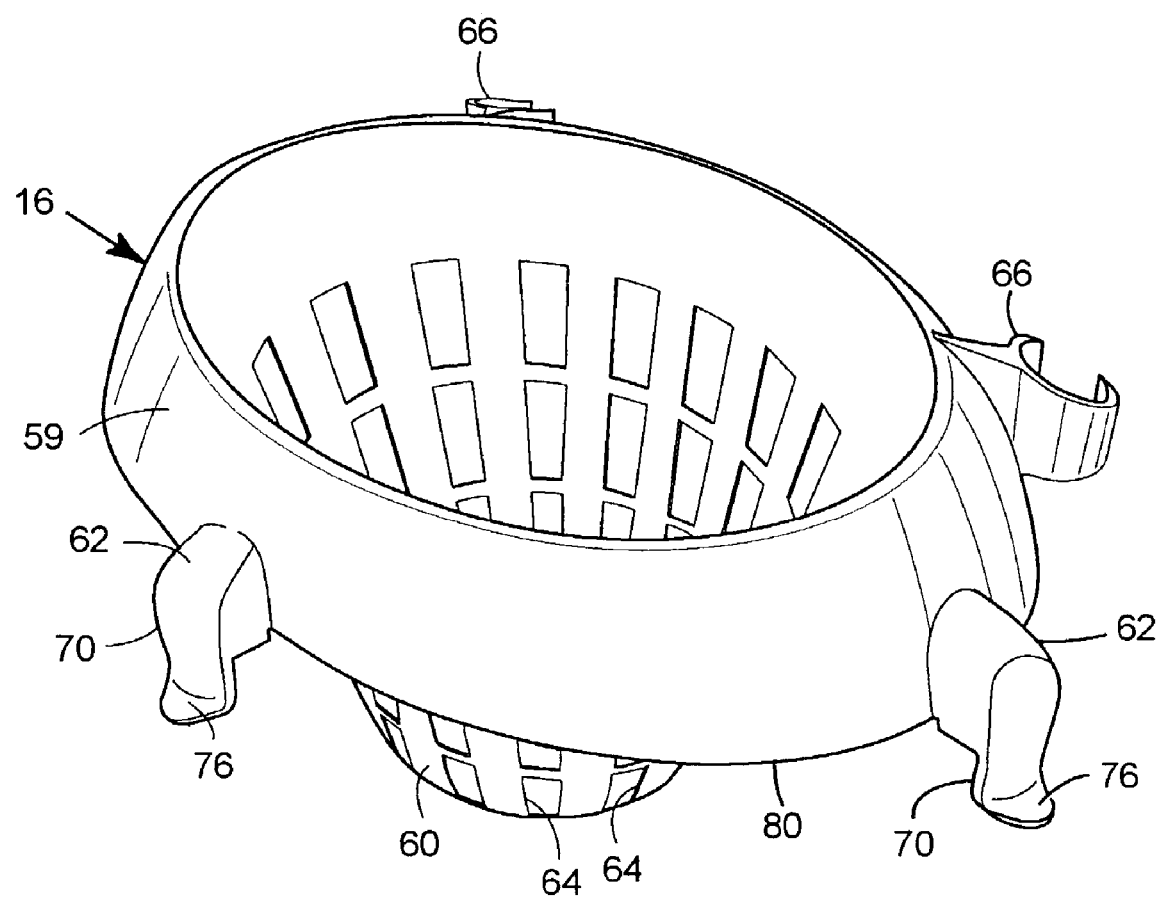
FIGS. 12-14 are perspective and reduced top and side views of the removable wringer in the combination seen in FIGS. 1-3.
Figure 13:
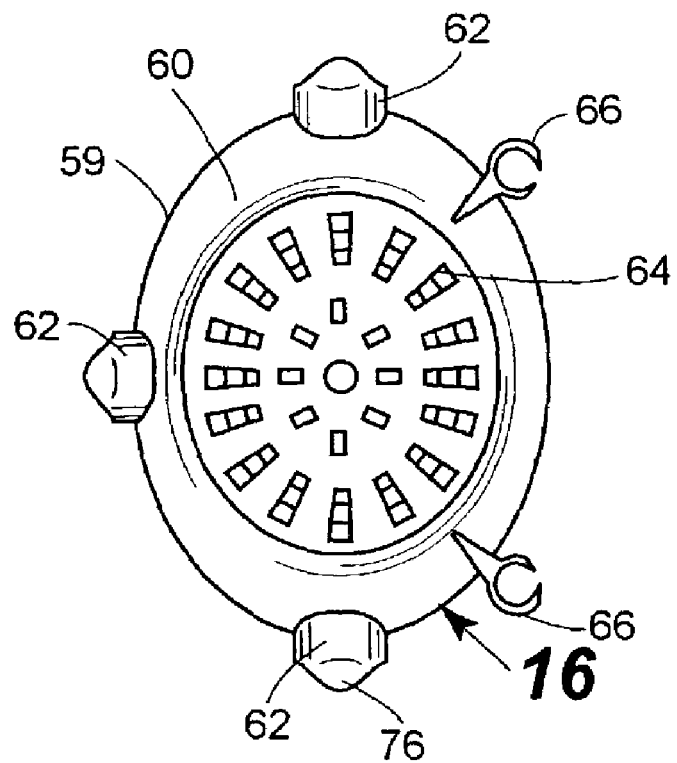
Figure 14:
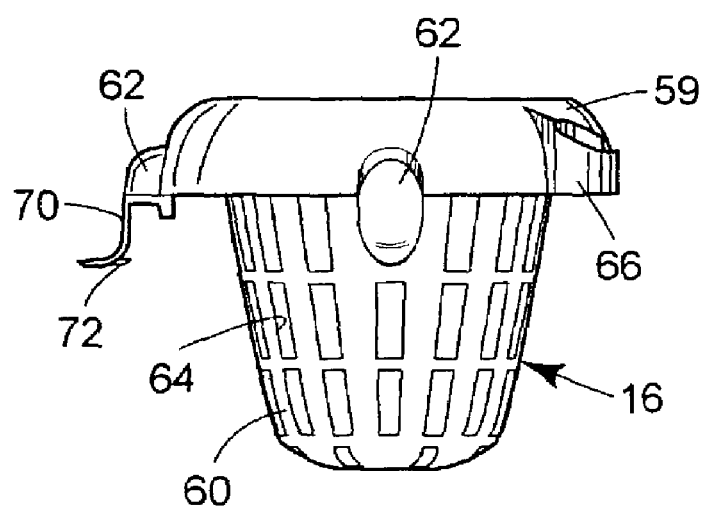

An example of a removable wringer 16 can be seen in FIGS. 12-14. The wringer that has been illustrated includes a base 59, a wringer section 60, and three legs 62 that are spaced approximately 90 degrees apart on a horizontal plane. The illustrated wringer section is in the form of a web with slotted openings 64 that allow water to drain through the web. Other structural arrangements can also be used. The illustrated wringer has an upper opening that measures about 8 inches by 6 inches, providing an opening area of around 50 square inches. When attached to the illustrated bucket 12, one side of the wringer covers one of the non-linear ends 32 of the upper rim 22 of the bucket, and the other side of the wringer is spaced at a substantial distance from the other end of the upper rim. The relatively small size of the wringer compared to the larger bucket leaves an open area in the top of the bucket that enables the user to either place the mop in the wringer section or dip a mop into water in the larger bucket. The illustrated wringer is shown with a pair of open-ended support clips 66 that can be used to support or hold a mop handle.

To hold the illustrated wringer 14 in place on the larger bucket 12, the wringer may have a flange 70 on one or more of the legs 62. As best seen in FIG. 11, the illustrated flange has an inwardly extending tab 72 near its lower-most end. When the wringer is positioned on the bucket, the tab slides down over the upper rim 22 of the bucket and snaps in place against a section of the lower edge 24 of the upper rim, holding the wringer down.

In the illustrated embodiment of the invention, the flange 70 is sized and disposed to fit within the aperture 54 in the loop 50 in the inner bucket 14. This arrangement enables the wringer 16 to be conveniently attached to the lower edge 24 on the larger bucket 12 even when the inner bucket is in place. The wringer 14 may also have a downwardly-projecting knob 74 (best seen in FIG. 11) that is spaced inwardly from one of the flanges at a distance that is approximately equal to the width of the upper rim 22 on the bucket 12. This knob engages the inside edge of the upper rim on the larger bucket to stop the wringer from sliding outwardly, regardless of whether the inner bucket is used.

One or more of the flanges 70 on the removable wringer 14 may have an outwardly-extending arm 76, which can be used to facilitate release of the wringer from the larger bucket 12. Pressing upwardly on the arm helps to retract the tab 72 from engagement with the lower edge 24 on the upper rim 22.

The bucket combination can be used in many ways. Both the bucket 12 and the inner bucket 14 can, of course, be used alone. When the user wants to keep two things separate (such as dirty water and clean water, or water and other cleaning supplies) the two buckets can be combined together, with the inner bucket inside and at one end of the larger bucket. In that arrangement, the size differential in the two buckets leaves access to the reservoir 20 on the larger bucket and the projection 50 on the inner bucket helps to stop the inner bucket from inadvertently sliding toward the other side of the larger bucket.

The illustrated wringer 16 can be used on either bucket. When used on the inner bucket 14, a lower rim 80 on the wringer (FIG. 12) rests on top of the ledge 42 on the inner bucket and, in the illustrated embodiment, on the flat side 45 of the bail 46 (FIG. 7). The legs 62 and flanges 70 on wringer fit within the interior aperture 54 on the inner bucket, preventing side-to-side movement. When used on the larger bucket 12 (either with or without the inner bucket in place), the flanges 70 on the wringer extend over the sides of the upper rim 22 and engage the lower edge 24 on the larger bucket, preventing the wringer from sliding and also locking the wringer (and the inner bucket, if used) down onto the larger bucket.

This description of one embodiment of the invention has been provided merely for illustrative purposes. The scope of the invention is set forth in the following claims.

The invention claimed is:

1. A bucket combination comprising:
   an outer bucket including a reservoir and an upper rim, the upper rim having a lower edge section;
   a removable inner bucket configured to fit within at least a portion of the reservoir of the outer bucket, the inner bucket including a reservoir and a projection, the projection fitting over the upper rim of the outer bucket and having a tab extending from an interior surface for engaging the lower edge section of the upper rim; and
   a removable wringer, the wringer including a wringer section configured to fit within the reservoir of the inner bucket and a flange fitting over the upper rim and having a tab that engages the lower edge section on the upper rim,
   the projection having an interior aperture configured to receive the flange of the removable wringer and allow passage of the tab on the flange through the aperture.

2. The bucket combination as recited in claim 1 wherein the projection has two tabs, each tab disposed on an opposing side of the interior aperture.

3. The bucket combination as recited in claim 2 wherein the two tabs are positioned at approximately the same vertical height as the tab on the flange of the wringer when the wringer is disposed within the reservoir of the inner bucket.

4. The bucket combination as recited in claim 1 wherein the projection is U-shaped.

5. The bucket combination as recited in claim 1 wherein the flange on the wringer includes an outwardly extending portion for facilitating disengagement of the flange with the lower edge section on the upper rim of the outer bucket.

6. The bucket combination as recited in claim 1 wherein the wringer includes a clip for supporting a mop handle.

7. The bucket combination as recited in claim 1 wherein the wringer section includes a web.

8. The bucket combination as recited in claim 1 wherein the wringer includes a downwardly-extending knob spaced inwardly of the flange at a distance that is approximately equal to the width of the upper rim of the outer bucket.

9. The bucket combination as recited in claim 1 wherein the wringer includes three flanges.

10. The bucket combination as recited in claim 1 wherein the inner bucket includes three projections.

11. A bucket combination comprising:
    an outer bucket including a reservoir and an upper rim having a lower edge section;
    a removable inner bucket configured to fit within at least a portion of the reservoir of the outer bucket, the inner bucket including a reservoir, a projection, the projection fitting over the upper rim of the outer bucket and having a tab extending from an interior surface for engaging the lower edge section of the upper rim, and a bail including a generally flat side, and an upper rim having a perimeter and including an upper surface extending around a portion of the perimeter and a recess extending along the remaining portion of the perimeter, the recess shaped to receive the bail in a storage position, the generally flat side of the bail forming a generally planar surface with the upper surface of the upper rim when the bail is received in the recess; and
    a removable wringer including a wringer section configured to fit within the reservoir of the inner bucket and a flange fitting over the upper rim and having a tab that engages the lower edge section on the upper rim, the wringer supported at least in part by the generally planar surface, the projection having an interior aperture configured to receive the flange of the removable wringer and allow passage of the tab on the flange through the aperture.

12. The bucket combination as recited in claim 11 wherein the wringer includes an upper rim and a skirt extending from at least a portion of the upper rim of the wringer, the skirt having a lower edge, the lower edge resting on at least a portion of the upper rim of the inner bucket when the wringer is disposed within the reservoir of the inner bucket.

13. The bucket combination as recited in claim 11 wherein the bail is generally U-shaped in cross-section.

14. The bucket combination as recited in claim 11 wherein the bail fits within an outer perimeter defined by the upper rim of the inner bucket.

15. A bucket combination comprising:
a bucket including a reservoir, an upper rim and a projection extending from the upper rim; and
a removable wringer including a flange and a wringer section configured to fit within the reservoir of the bucket,
the projection including a first generally horizontal portion extending from the upper rim and a second generally vertical portion extending from the first portion and having an aperture configured to receive the flange of the wringer to limit lateral movement of the wringer.

16. The bucket combination as recited in claim 15 wherein the projection is U-shaped.

17. The bucket combination as recited in claim 15 wherein the flange on the wringer includes an outwardly extending portion for facilitating removal of the flange from the projection of the bucket.

18. The bucket combination as recited in claim 15 wherein the wringer includes a clip for supporting a mop handle.

19. The bucket combination as recited in claim 15 wherein the wringer section includes a web.

20. The bucket combination as recited in claim 15 wherein the wringer includes three flanges and the inner bucket includes three projections.

21. A bucket combination comprising:
a bucket including a reservoir, a bail including a generally flat side, an upper rim, and a projection extending from the upper rim, the upper rim having a perimeter and including an upper surface extending around a portion of the perimeter and a recess extending along the remaining portion of the perimeter, the recess shaped to receive the bail in a storage position, the generally flat side of the bail forming a generally planar surface with the upper surface of the upper rim when the bail is received in the recess; and
a removable wringer having a lower rim, the wringer including a wringer section and a flange, the wringer section configured to fit within the reservoir of the bucket, the wringer substantially supported by a portion of the lower rim resting on the generally planar surface,
the projection including a first generally horizontal portion extending from the upper rim and a second generally vertical portion extending from the first portion and having an aperture configured to receive the flange of the wringer to limit lateral movement of the wringer.

22. The bucket combination as recited in claim 21 wherein the bail is generally U-shaped in cross-section.

23. The bucket combination as recited in claim 21 wherein the bail fits within an outer perimeter defined by the upper rim of the bucket.

* * * * *